US009950402B2

(12) United States Patent
Krulj et al.

(10) Patent No.: US 9,950,402 B2
(45) Date of Patent: Apr. 24, 2018

(54) SYSTEM AND METHOD FOR ALIGNING AN INGOT WITH MOUNTING BLOCK

(71) Applicant: MEMC Electronic Materials, Inc., St. Peters, MO (US)

(72) Inventors: Dusan Krulj, St. Louis, MO (US); John Michael Pogany, St. Peters, MO (US)

(73) Assignee: Corner Star Limited, Kowloon (HK)

( * ) Notice: Subject to any disclaimer, the term of this patent is extended or adjusted under 35 U.S.C. 154(b) by 771 days.

(21) Appl. No.: 13/731,222

(22) Filed: Dec. 31, 2012

(65) Prior Publication Data

US 2014/0183806 A1 Jul. 3, 2014

(51) Int. Cl.
*B23Q 1/25* (2006.01)
*B24B 5/50* (2006.01)
*B28D 5/00* (2006.01)

(52) U.S. Cl.
CPC .............. *B24B 5/50* (2013.01); *B28D 5/0082* (2013.01)

(58) Field of Classification Search
CPC ................................ B24B 5/50; B28D 5/0082
USPC .... 269/71, 55, 60, 309, 903, 37, 43, 56, 61, 269/289 R, 136–138, 75, 310; 451/285–288; 29/281.1, 281.5, 281.6; 254/100, 103, 104; 52/103
See application file for complete search history.

(56) References Cited

U.S. PATENT DOCUMENTS 4,409,860 A * 10/1983 Moriyama et al. ........ 74/490.09
4,951,422 A 8/1990 Ibe et al.
5,007,204 A 4/1991 Ibe et al.
5,089,081 A * 2/1992 Bedzyk ......................... 156/556
5,095,629 A 3/1992 Klemer et al.
5,201,145 A 4/1993 Ibe
5,205,080 A 4/1993 Ibe et al.
5,523,941 A * 6/1996 Burton et al. ................. 700/60
5,870,815 A 2/1999 Karner et al.
5,919,083 A 7/1999 Lim
5,982,128 A * 11/1999 Lee .......................... 318/568.16
6,052,911 A 4/2000 Davis
6,279,564 B1 * 8/2001 Hodsden ............ B23D 57/0046 125/16.01
6,397,448 B1 6/2002 Cobb
6,640,855 B2 11/2003 Giles
(Continued)

FOREIGN PATENT DOCUMENTS

EP 0049827 A1 4/1982
EP 0049827 B1 9/1984
(Continued)

OTHER PUBLICATIONS

Non-Final Office Action, U.S. Appl. No. 13/731,219, dated Dec. 19, 2014, 12 pages.

*Primary Examiner* — David Bryant
*Assistant Examiner* — Nirvana Deonauth
(74) *Attorney, Agent, or Firm* — Armstrong Teasdale LLP

(57) ABSTRACT

An alignment system for aligning an ingot of semiconductor or solar-grade material is provided. The alignment system includes a mounting block for attachment to the ingot, an optical device for aligning a predetermined centerline of the ingot with a reference line, and adjustable supports configured for supporting the ingot on at least four support points and configured to adjust the position of the ingot. The mounting block is movable between a horizontal position and a vertical position.

20 Claims, 7 Drawing Sheets

(56) References Cited

U.S. PATENT DOCUMENTS

| | | | | |
|---|---|---|---|---|
| 6,643,019 | B1 | 11/2003 | Jeanneret | |
| 7,854,157 | B2 | 12/2010 | Kemmochi et al. | |
| 7,992,312 | B2 | 8/2011 | Krasko | |
| 8,376,809 | B2 | 2/2013 | Kaito | |
| 8,397,398 | B2 | 3/2013 | Poloni | |
| 8,714,533 | B2 * | 5/2014 | Jenkins | B60J 5/00 254/134 |
| 2003/0041919 | A1 | 3/2003 | Giles | |
| 2007/0163302 | A1 | 7/2007 | Kemmochi et al. | |
| 2008/0142188 | A1 | 6/2008 | Ishigami | |
| 2009/0064627 | A1 | 3/2009 | Struthers et al. | |
| 2010/0101298 | A1 | 4/2010 | Carstensen | |
| 2010/0154606 | A1 * | 6/2010 | Thyni | 82/105 |
| 2010/0170099 | A1 | 7/2010 | Krasko | |
| 2010/0216375 | A1 | 8/2010 | Kaito | |
| 2011/0109030 | A1 * | 5/2011 | Flaig | 269/55 |
| 2011/0126417 | A1 | 6/2011 | Poloni | |
| 2012/0242024 | A1 * | 9/2012 | Watts | B25B 1/2484 269/59 |
| 2013/0082169 | A1 * | 4/2013 | Kilibarda | 250/222.1 |
| 2014/0183806 | A1 | 7/2014 | Krulj et al. | |

FOREIGN PATENT DOCUMENTS

| | | | |
|---|---|---|---|
| EP | 0359591 | A2 | 3/1990 |
| EP | 0450579 | A2 | 10/1991 |
| EP | 0361802 | B1 | 12/1993 |
| EP | 0588376 | A1 | 3/1994 |
| EP | 0450579 | B1 | 10/1994 |
| EP | 0359591 | B1 | 11/1995 |
| EP | 0588376 | B1 | 12/1998 |
| EP | 2226155 | A2 | 9/2010 |
| JP | 2010221393 | A | 10/2010 |
| WO | 2009101761 | A1 | 8/2009 |
| WO | 2010016036 | A1 | 2/2010 |

* cited by examiner

SYSTEM AND METHOD FOR ALIGNING AN INGOT WITH MOUNTING BLOCK

FIELD

The field relates generally to systems and methods for processing ingots of semiconductor or solar-grade material into wafers and, more specifically, to systems for positioning such ingots for slicing.

BACKGROUND

Silicon and other semiconductor wafers used in semiconductor devices, as well as solar wafers used in solar devices, are generally prepared from an ingot. The typical ingot has a generally cylindrical shape, but is not a perfect cylinder. Once the ingot has been grown, the ingot is cut to have a desired cross-sectional shape (e.g., a pseudo-square). Typically, the ingot is mounted on a mounting block to carry out the cutting operation. In order to maximize the usable volume of the ingot and minimize the size of the ingot needed to cut the desired cross-sectional shape, a predetermined centerline of the ingot should be aligned with the center of a mounting block, such that when the ingot is placed in a cutting assembly, the axis along which the ingot is cut is substantially aligned with the predetermined centerline of the ingot. Once mounted, the axis defined by the center of mounting block should be substantially the same as the axis along which the ingot is cut during the cutting procedures. Thus, the predetermined centerline of the ingot should be aligned with the center of a mounting block to the extent possible.

Conventionally, the semiconductor ingot is aligned with the center of the mounting block by use of centering plates having a "V"-shaped notch, also known as "V"-block halves. "V"-block halves are disposed on opposite sides of the ingot, and are attached to a threaded screw such that the centering plates can be closed around the ingot by rotation of the threaded screw. By closing the "V"-block halves around the ingot, the "V"-shaped notches engage the outer surface of the ingot, thereby adjusting the position of the ingot with respect to a mounting block. Once the ingot is aligned, adhesive is applied to a vertically positioned mounting block, and the ingot is adhered to the mounting block. The "V"-block halves determine the centerline of the ingot to be aligned with the mounting block, and do not permit alignment of a predetermined centerline.

This conventional method has several drawbacks. Because of imperfections in the ingot's shape, use of the "V"-block halves may result in the ingot being off-center from its volume maximizing centerline, thus resulting in wasted material during the cutting procedure. This may be corrected or compensated for by shims. But attempts to correct by use of shims or the like are extremely time consuming, and often inaccurate because there is no reliable way for the operator to verify that the ingot is optimally positioned. Also, because the mounting block is disposed vertically in close proximity to the ingot, the operator has little room to apply adhesive to the mounting block, thus making the process difficult. Accordingly, a need exists for a better system or method for centering and aligning an ingot with a mounting block.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, an alignment system for aligning an ingot of semiconductor or solar-grade material includes a mounting block for attachment to the ingot, an optical device for aligning a predetermined centerline of the ingot with a reference line, and adjustable supports configured for supporting the ingot on at least four support points and configured to adjust the position of the ingot. The mounting block is movable between a horizontal position and a vertical position.

In another aspect, an alignment system for aligning an ingot of semiconductor or solar-grade material includes a mounting block for attachment to the ingot, at least one laser for aligning a predetermined centerline of the ingot with a reference line, adjustable supports configured for supporting the ingot on at least four support points and configured to adjust the position of the ingot, and a plurality of adjusters. Each adjustable support is coupled to one of the adjusters, and is configured to move an adjustable support independently of the other adjustable supports laterally inward or outward with respect to the ingot.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols used in the various drawings indicate like elements.

DETAILED DESCRIPTION

Referring now to FIGS. 1-4, an alignment system of one embodiment for aligning an ingot 102 of semiconductor or solar-grade material with a mounting block is indicated generally at 100. The ingot 102 is supported by a plurality of adjustable supports indicated generally at 110.

Figure 1:
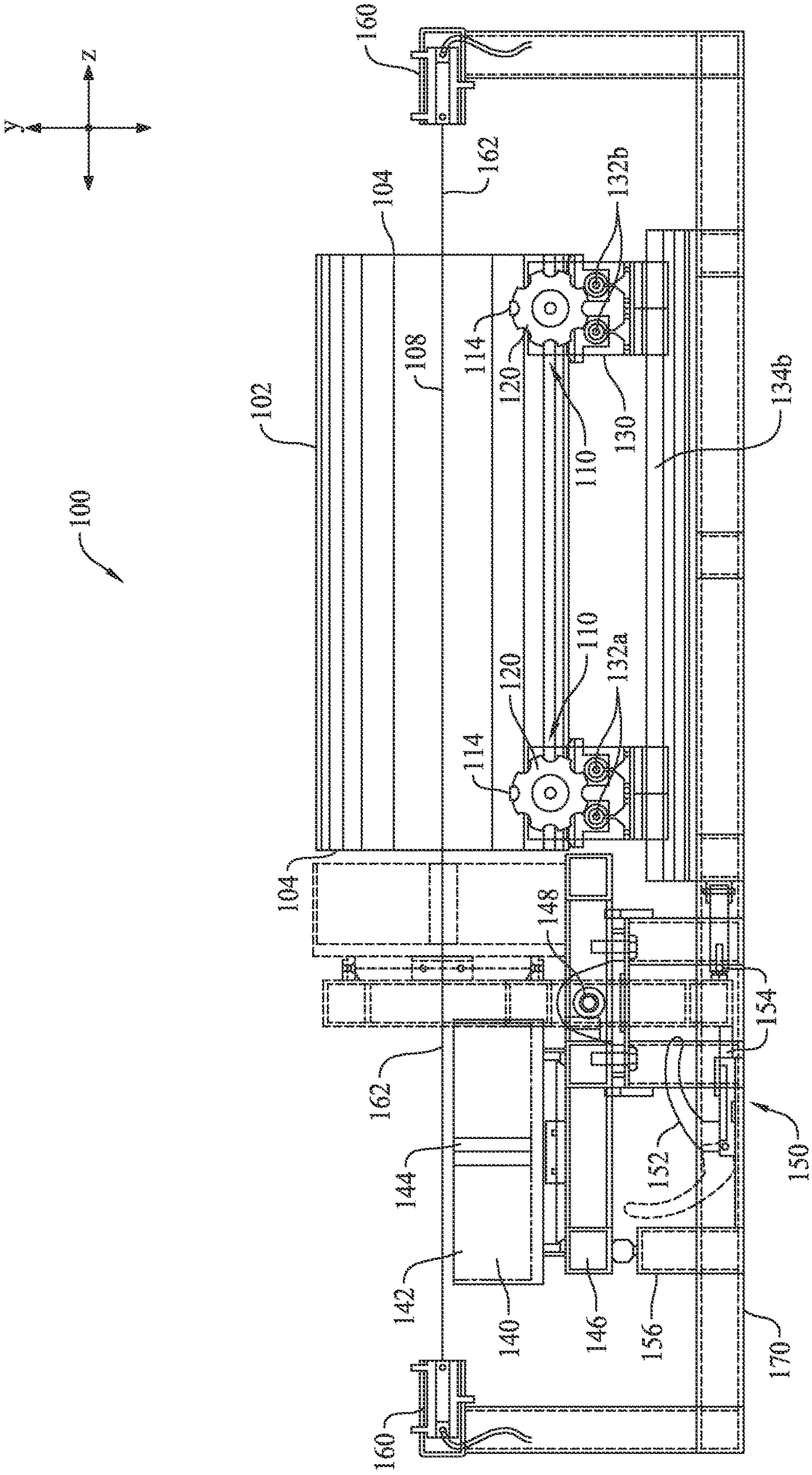
FIG. 1 is a side view of an alignment system of one embodiment.
Figure 2:
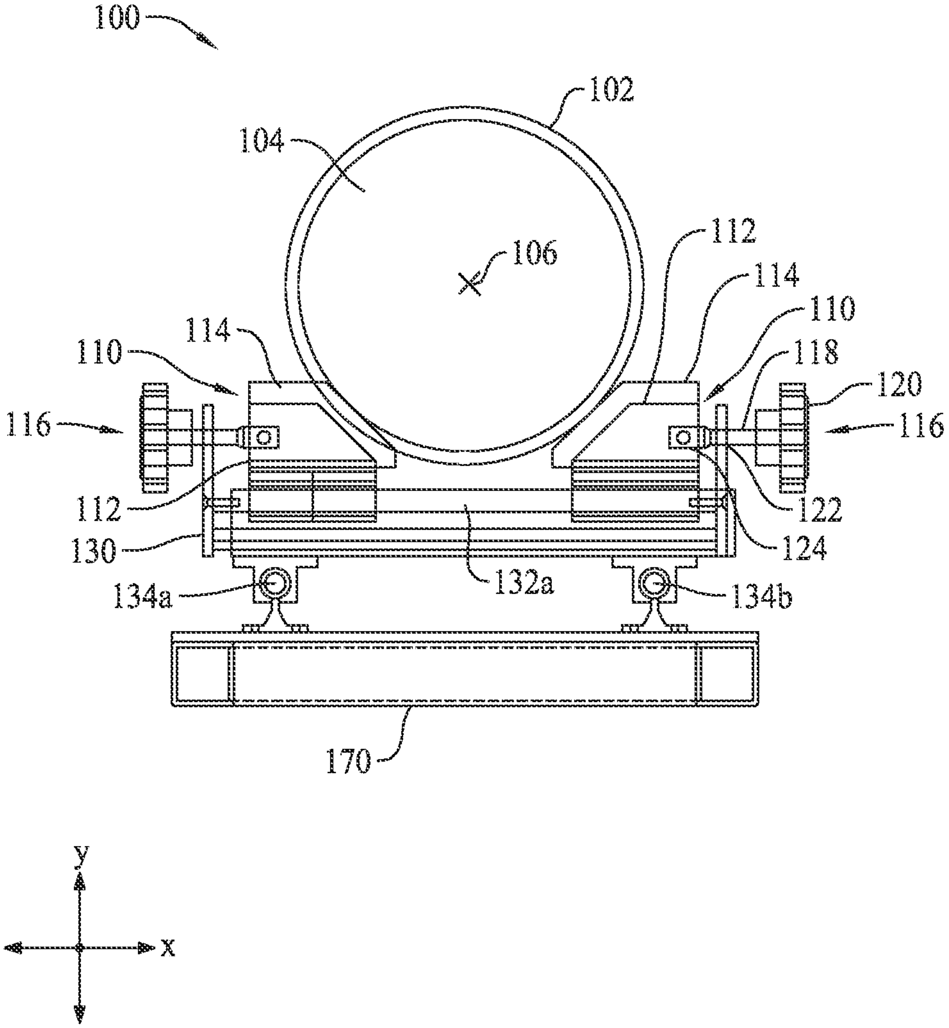
FIG. 2 is a side view of the alignment system of FIG. 1 with the mounting block and lasers omitted.
Figure 3:
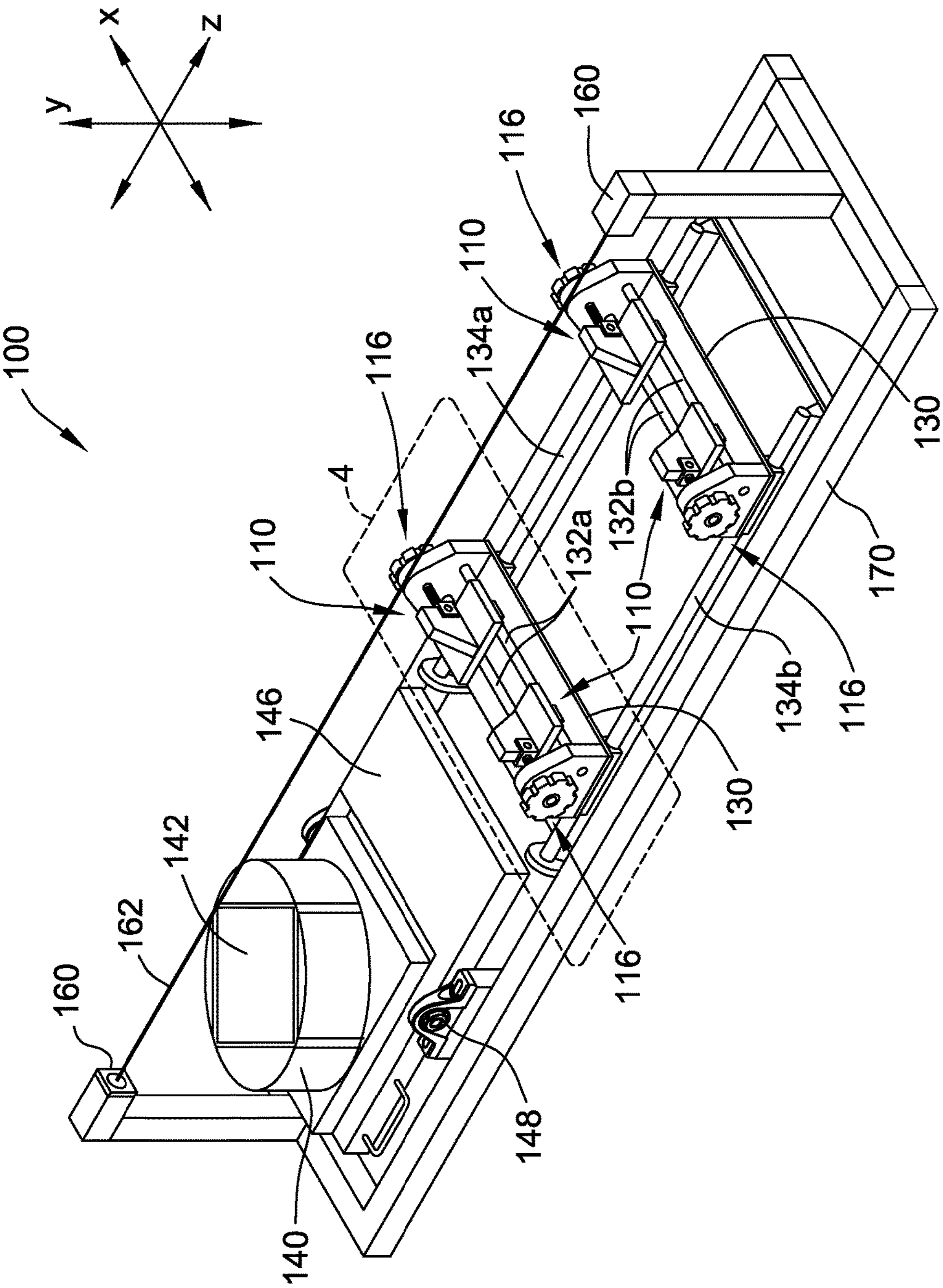
FIG. 3 is a perspective view of the alignment system of FIG. 1 with the ingot omitted.

As shown in FIGS. 1-4, the ingot 102 is suitably supported in this embodiment by four adjustable supports 110. Each adjustable support 110 is slidingly connected to a rail of a first pair of rails 132*a*, 132*b*. The rails 132*a*, 132*b* extend in a direction substantially perpendicular to the longitudinal axis of ingot 102. Each rail 132*a* and 132*b* suitably includes two rails, as shown in FIGS. 1 and 3, though a different number of rails may be used. As shown in FIG. 3, each rail 132*a* and 132*b* is connected to two adjustable supports 110 disposed on opposite sides of ingot 102. Rails 132*a* and 132*b* are mounted to support bracket 130. Rails 132*a* and 132*b* are further connected to a second pair of rails 134*a*, 134*b* via support bracket 130. Rails 134*a* and 134*b* are connected to frame 170. Rails 134*a* and 134*b* are disposed on opposite sides of ingot 102 and extend in a direction substantially parallel to the longitudinal axis of ingot 102. In this configuration, adjustable supports 110 move simultaneously in pairs along a second pair of rails 134*a*, 134*b*.

Figure 4:
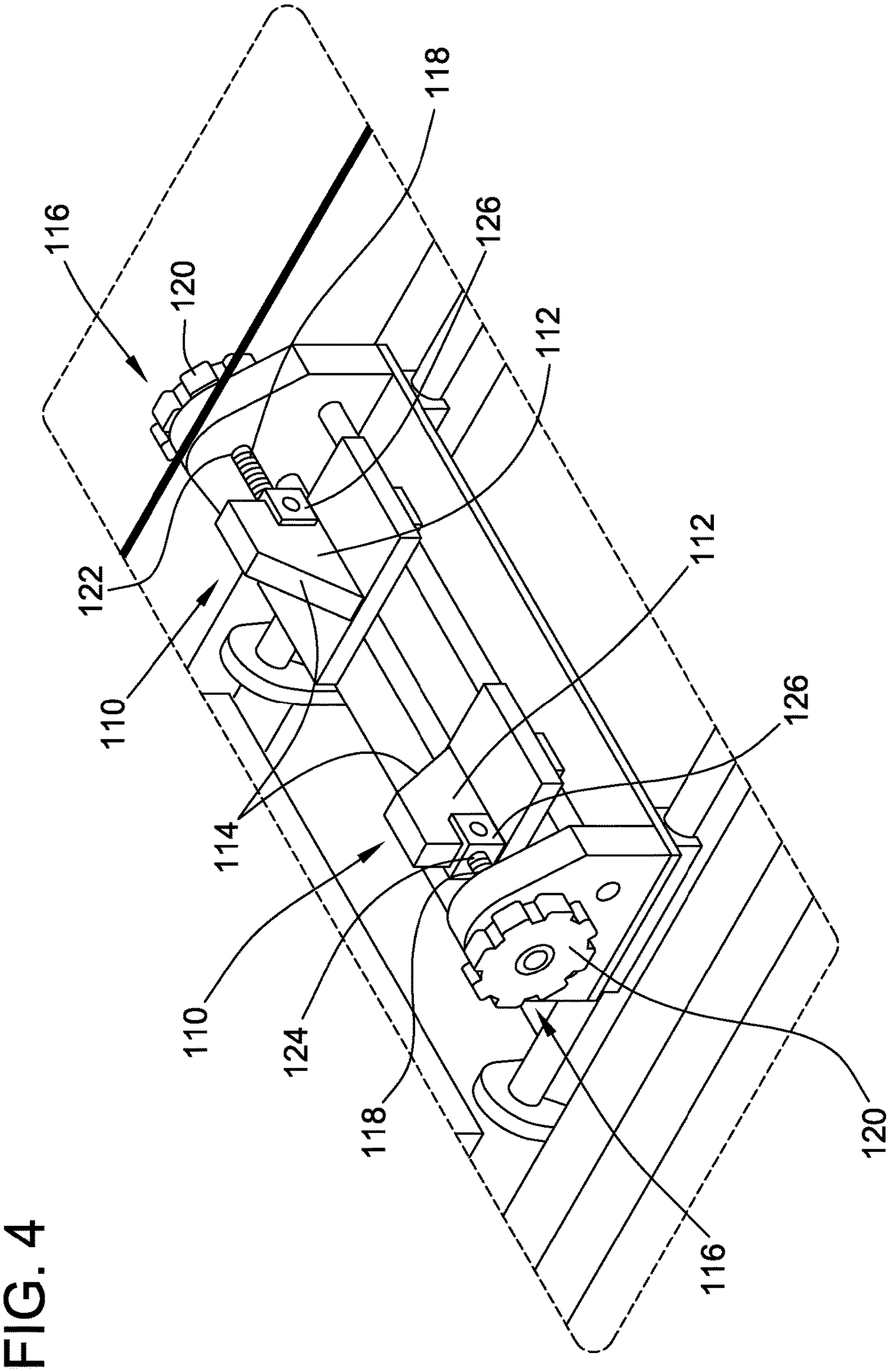
FIG. 4 is an enlarged view of the adjustable supports that support the ingot.

As shown in FIG. 4, each adjustable support 110 includes a base 112, and a support member 114 that engages the circumferential surface of ingot 102. In the embodiment illustrated in FIGS. 1-4, support members 114 are inclined planes disposed at an angle of about 45 degrees with respect to the horizontal. Inclined planes disposed at an angle other than 45 degrees are also suitable for use with this embodiment. Other structures are also suitable for use as support members 114, such as discs, wheels, ball bearings, rollers and the like.

Alignment system 100 also includes a plurality of adjusters, indicated generally at 116. Each adjustable support 110 is coupled to one of the adjusters 116. Adjusters 116 are configured to move the adjustable supports 110 coupled thereto inwardly and outwardly with respect to the longitudinal axis of ingot 102. Adjuster 116 can include, but is not limited to, rods, hydraulic cylinders, screws, bolts, and other devices suitable for moving adjustable supports 110 inwardly and outwardly with respect to the longitudinal axis of ingot 102. In this embodiment, each adjuster 116 comprises an adjustment screw 118 coupled to a handle 120.

Adjustment screw 118 is connected to support bracket 130 at a threaded opening 122 in support bracket 130 and is coupled to base 112 at receiving end 124. Threaded opening 122 is threaded so as to engage the threads of adjustment screw 118 when handle 120 is rotated. Receiving end 124 includes a U-clamp or bracket 126 for coupling adjustment screw 118 to base 112. Rotating handle 120 about the longitudinal axis of adjustment screw 118 causes the threads of adjustment screw 118 to engage the threads of threaded opening 122, thereby causing adjustment screw 118 to move inwardly or outwardly with respect to the ingot 102. In turn, adjustment screw 118 exerts a force on base 112 at receiving end 124, thereby causing adjustable support 110 to move inwardly or outwardly with respect to the ingot 102. Adjustment screws 118 may be finely threaded to allow for precise alignment of ingot 102.

By moving adjustable supports 110 independently of or in conjunction with one another via adjusters 116, ingot 102 can be moved in four degrees of freedom. Specifically, ingot 102 can be moved in the x and y directions of an x, y, z orthogonal coordinate system defined so that the face 142 of mounting block 140 is disposed in the x, y plane and the z-axis is perpendicular to mounting block face 142 when mounting block 140 is in a generally vertical position. Ingot 102 can also be rotated about the y-axis and the x-axis of the x, y, z orthogonal coordinate system by moving adjustable supports 110 independently of or in conjunction with one another via adjusters 116. Ingot 102 can be moved in an additional degree of freedom—the z direction of the x, y, z orthogonal coordinate system—by sliding adjustable supports 110 in unison along rails 134*a* and 134*b*. The ease with which ingot 102 can be moved permits faster and more accurate alignment of ingot 102 with mounting block 140. Further, because adjustable supports 110 can be moved independently of one another in the x-direction, the operator (not shown) of alignment system 100 can account for imperfections in the ingot's diameter or deviations along the longitudinal axis of the ingot without the use of shims or other time consuming corrections. Additionally, because adjustable supports 110 can be moved independently of one another in the x-direction, a predetermined ingot centerline 108 can be aligned with the center of the mounting block 140.

The predetermined ingot centerline 108 is the line about which ingot 102 is cut once the ingot 102 is mounted on the mounting block 142 as described herein. The predetermined ingot centerline 108 is based upon a desired cross-sectional shape of the ingot 102 to be cut (e.g., a pseudo-square), and is determined based upon manual and/or computer aided measurements and calculations.

A mounting block 140 is positioned adjacent to one of the ingot faces 104. Mounting block 140 is capable of being moved from a generally horizontal position to a generally vertical position (shown with dashed lines in FIG. 1) such that mounting block face 142 is substantially parallel to one of the ingot faces 104 when in a generally vertical position. Having a mounting block movable from a generally horizontal position to a generally vertical position provides easy access to the face of the mounting block, which allows for precise application of adhesives to the face of the mounting block. In the embodiment shown in FIGS. 1 and 3, mounting block 140 is connected to plate 146 via screws, bolts, pins or any other connection means suitable for connecting mounting block 140 to plate 146. Plate 146 is pivotally connected to pivot 148, which allows plate 146 to rotate between a generally horizontal position and a generally vertical position (shown with dashed lines in FIG. 1). In turn, rotation of plate 146 causes mounting block 140 to move from a generally horizontal position to a generally vertical position. Plate 146 can be rotated by hand or mechanical means (not shown). A locking mechanism, indicated generally at 150 in FIG. 1, is used to restrict movement of plate 146 when plate 146 is in a generally vertical position. In this embodiment, locking mechanism 150 comprises a lever 152 and locking members 154. Lever 152 engages locking members 154 when moved from a first position (shown in FIG. 1) to a second position (shown in ghost) such that locking members 154 restrict movement of plate 146 when plate 146 is in a generally vertical position. Optionally, a plate support member 156 is disposed adjacent to plate 146 to provide additional support to plate 146 when it is in a generally horizontal position (as shown in FIG. 1).

One or more optical devices are positioned within alignment system 100 to aid the operator (not shown) in aligning predetermined ingot centerline 108 with mounting block 140. In this embodiment, the one or more optical devices include two lasers 160 disposed on opposite ends of alignment system 100. Lasers 160 are mounted to frame 170 facing each other such that the laser beam emitted by one laser coincides with the laser beam emitted from the other laser. The beams of lasers 160 thus define a single axis 162. Lasers 160 are further positioned within alignment system 100 such that the single axis 162 defined by lasers 160 coincides with the axis defined by the center 144 of mounting block 140 when mounting block 140 is in a generally vertical position. When mounting block 140 is in a generally horizontal position, the beams emitted by lasers 160 are incident upon the respective ingot faces 104.

In operation, a mark 106 is placed on each ingot face 104 for use in connection with the one or more optical devices. Any mark may be used for mark 106 (e.g., a dot, an "X", a circle, a ring, and the like).

In this embodiment, a mark 106 is placed on each ingot face 104 indicating the point to be aligned with the beam emitted by laser 160. The line defined by the center of marks 106 coincides with the predetermined ingot centerline 108 to be aligned with mounting block center 144. In the embodiment shown in FIGS. 2 and 4, the mark 106 comprises an "X", although any mark may be used (e.g., intersecting lines, a dot, an "X", a circle, a ring, and the like) provided the mark indicates a point on ingot face 104 to be aligned with the beam emitted from laser 160.

Figure 5:
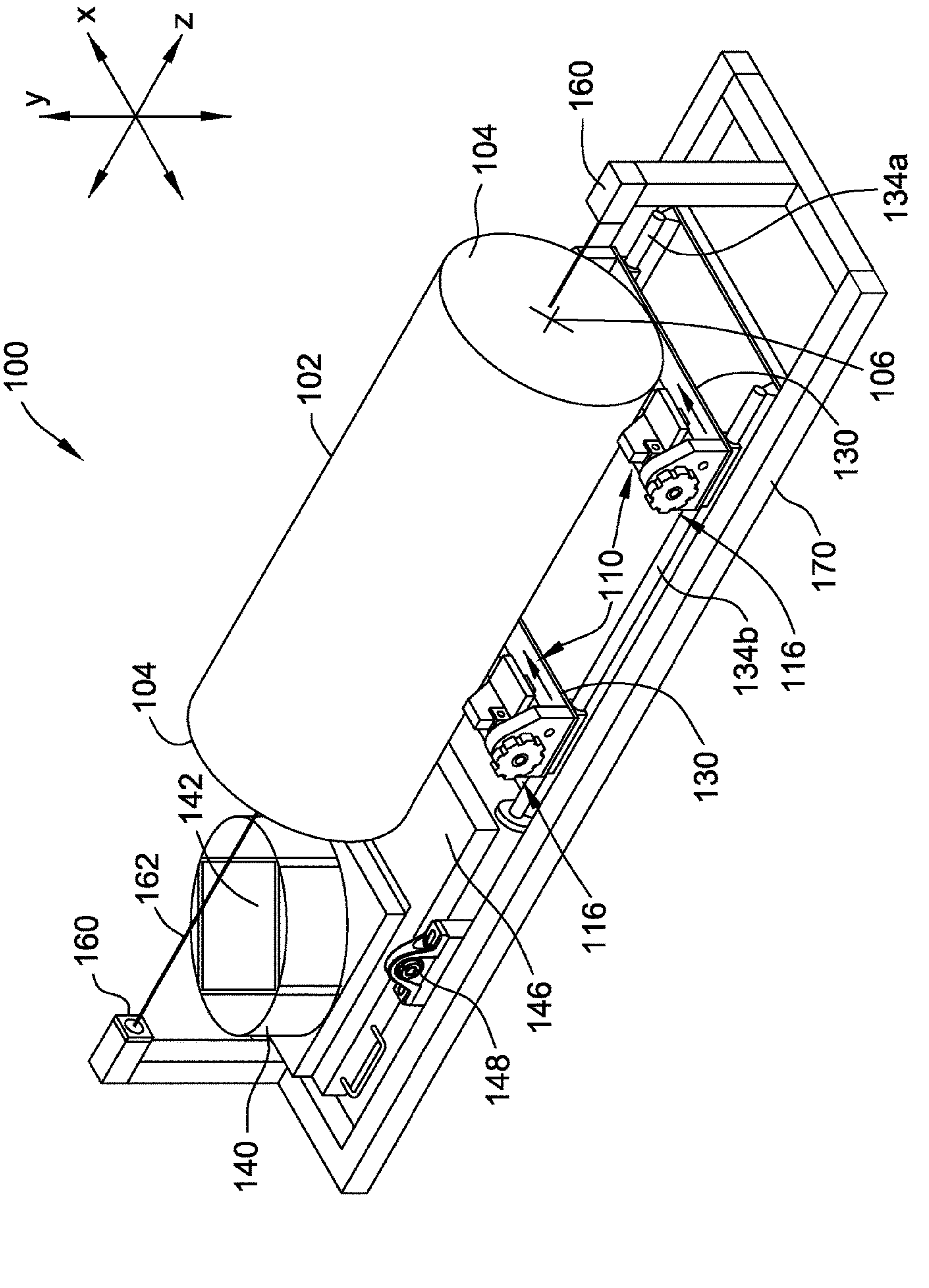
FIG. 5 is a perspective view of the alignment system of FIG. 3 with the ingot shown.
Figure 6:
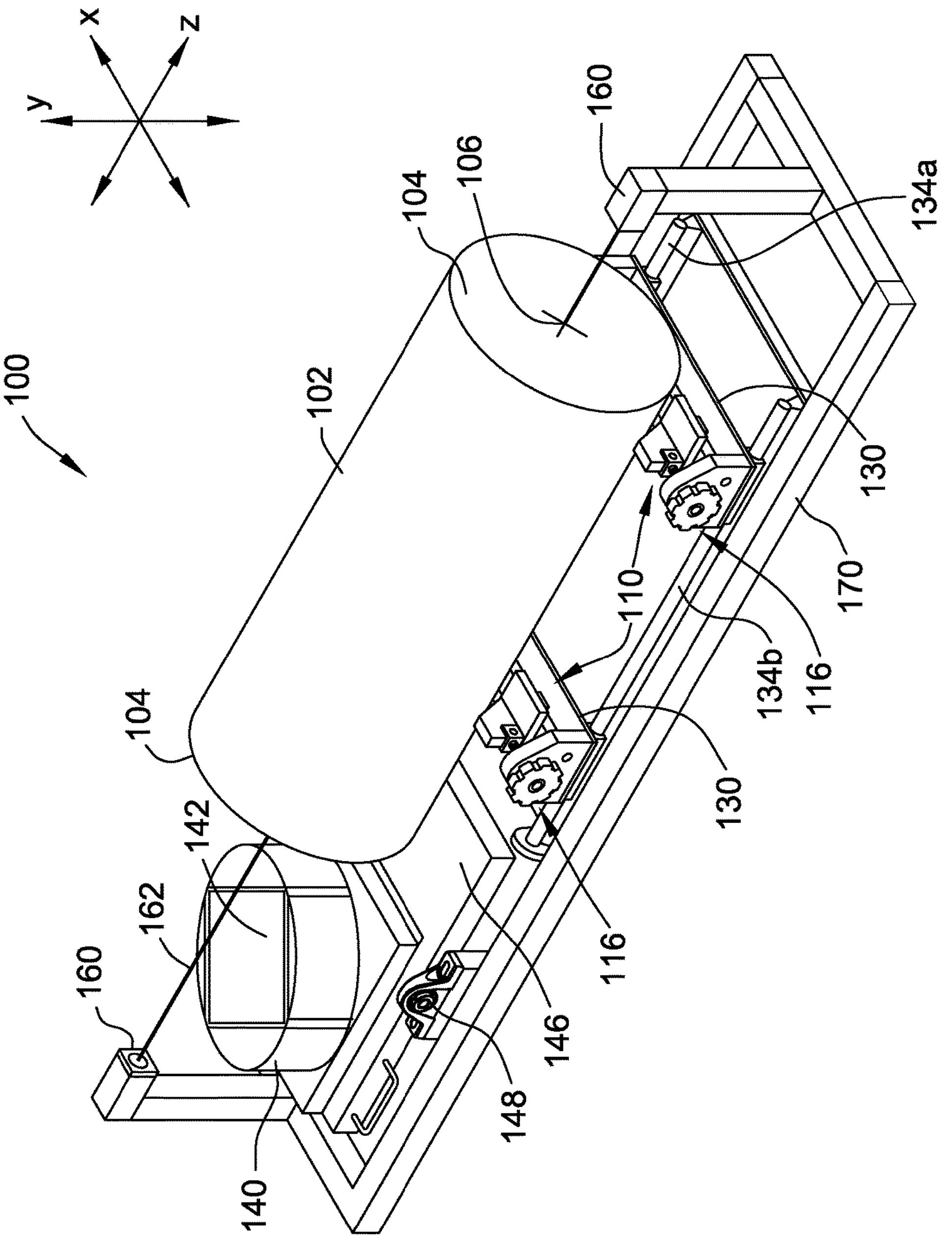
FIGS. 6 and 7 are perspective views of the alignment system of FIG. 3 showing a method of aligning and mounting the ingot.
Figure 7:
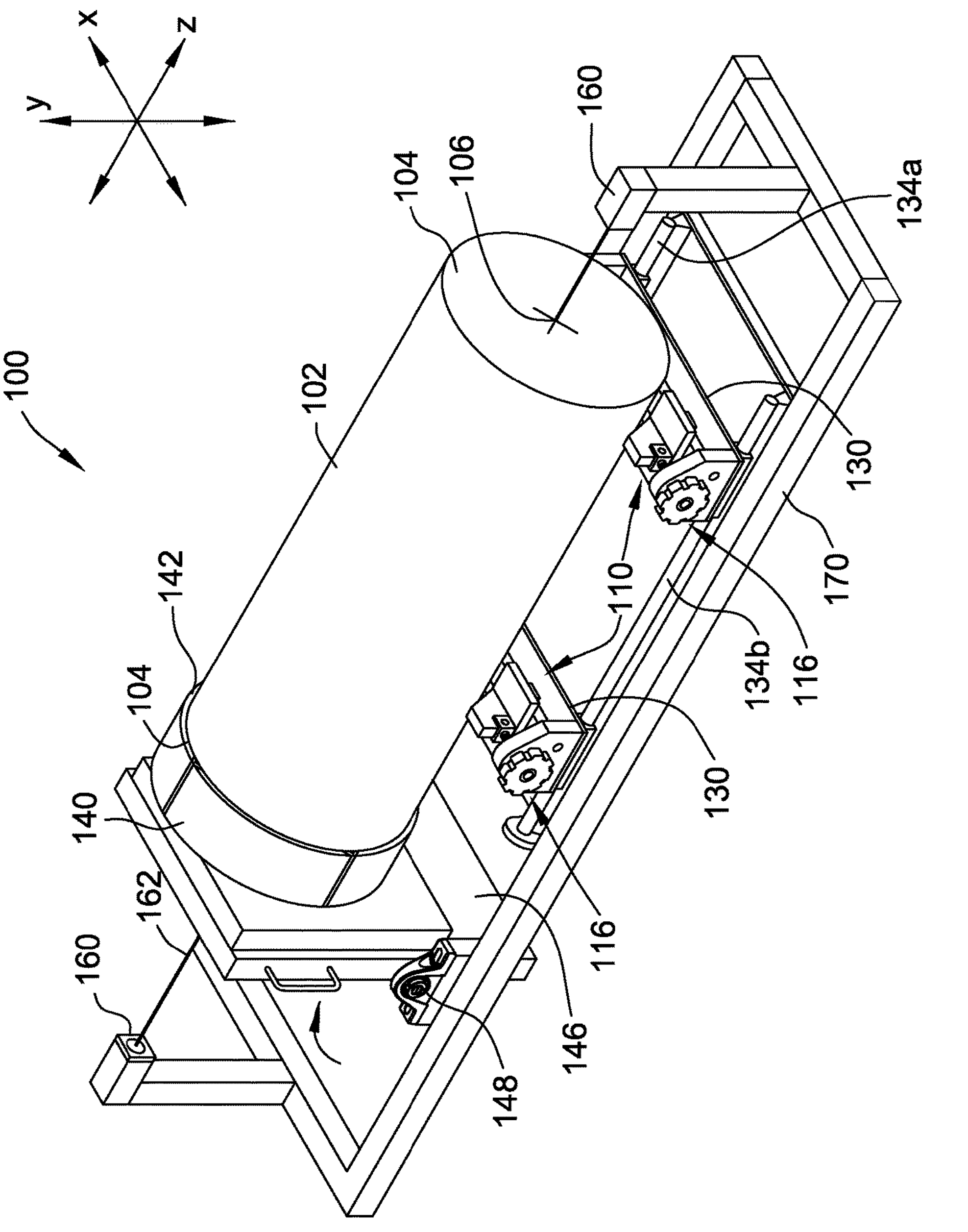

Referring now to FIGS. 5-7, a method of using alignment system 100 of one embodiment will now be described with reference to the embodiment of alignment system 100 shown in FIGS. 1-4. During use of the alignment system 100, mounting block 140 is initially disposed in a generally horizontal position, as shown in FIG. 3. Adjustable supports 110 are positioned to receive ingot 102. As shown in FIG. 5, ingot 102 is loaded onto adjustable supports 110. Support members 114 support ingot 102 on at least four points along the circumferential surface of ingot 102. If not already on, lasers 160 are turned on to emit beams incident upon each ingot face 104. Prior to use of alignment system 100, lasers 160 may need to be calibrated and/or adjusted to ensure that the beams coincide with one another and define a single axis 162, and are perpendicular to mounting block face 142 when positioned in a generally vertical position. As shown in FIGS. 5 and 6, ingot 102 is then aligned with the axis defined by the coincidental beams of lasers 160 by moving adjustable supports 110 via adjusters 116 until marks 106 are aligned with the laser beams. Once ingot 102 is aligned, mounting block 140 is attached to ingot 102 by moving mounting block into a generally vertical position.

As shown in FIG. 5, the ingot centerline will generally not be initially aligned with the axis 162 defined by lasers 160. Aligning ingot 102 is accomplished by moving one or more adjustable supports 110 via adjusters 116 until the marks 106 on ingot faces 104 are aligned with the beams emitted by lasers 160. In the method shown in FIGS. 5-7, the predetermined ingot centerline 108 is initially offset from the axis 162 defined by lasers 160. To align marks 106, the handles 120 of the adjustable supports on the near side of alignment system 100 are rotated, causing the adjustment screws 118 to engage the bases 112 of the adjustable supports 110 at receiving ends 124. The adjustable supports 110 exert a force on the circumferential surface of ingot 102, thereby causing ingot 102 to move in the direction of the x- and y-axes. Adjustable supports 110 are moved in the foregoing manner until the mark 106 on each ingot face 104 is aligned with the beam from laser 160 incident on the respective ingot face 104, as shown in FIG. 6. Because marks 106 define the predetermined ingot centerline 108, aligning the marks 106 with the axis defined by coincidental beams of lasers 160 aligns the predetermined ingot centerline 108 with the axis defined coincidental beams of laser 160.

As shown in FIGS. 6 and 7, once the predetermined ingot centerline 108 is aligned, the mounting block 140 is attached to ingot 102. The mounting block 140 is attached to ingot 102 such that the predetermined ingot centerline 108 remains aligned with the line defined by the coincidental beams of lasers 160. In this method, adhesive is applied to the mounting block face 142 while mounting block 140 is in a generally horizontal position. Adhesive is used to secure the mounting block 140 to the ingot 102, and to fill gaps between the mounting block 140 and ingot face 104 resulting from ingot face 104 not being perfectly parallel to mounting block face 142. Mounting block 140 is then moved from a generally horizontal position into a generally vertical position, such that the mounting block face 142 is perpendicular to predetermined ingot centerline 108. Ingot 102 is then moved along rails 134*a* and 134*b* via adjustable supports 110 such that ingot face 104 is brought into contact with mounting block face 142 and the adhesive.

In accordance with the present disclosure, ingots of semiconductor or solar-grade material can be aligned or positioned with the center of a mounting block faster and more accurately than prior art devices and methods. As further described herein, use of one or more optical devices and adjustable supports to align or position the ingot relative to the mounting block allows for faster and more accurate positioning and aligning of the ingot. Additionally, a predetermined centerline of an ingot of semiconductor or solar-grade material can be aligned with the center of a mounting block. As further described herein, use of independent adjustable supports allows for alignment of a predetermined ingot centerline with the center of a mounting block.

Various directional components of the foregoing systems and methods are described with reference to the ingot 102. Because ingot 102 is not perfectly cylindrical, these directional components may not be purely perpendicular to or purely parallel to the longitudinal axis of ingot 102 or the ingot face 104. Additionally, because ingot 102 is capable of being rotated about the x- and y-axes during use, these directional components may not be purely parallel to the longitudinal axis of ingot 102 or the ingot face 104. Accordingly, the term "substantially" is used in connection with these various directional components to account for the non-perpendicular or non-parallel component of these directional components.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An alignment system for aligning an ingot of semiconductor or solar-grade material comprising:

a mounting block for attachment to the ingot, the mounting block operatively connected to a pivot and configured to rotate about the pivot between a horizontal position and a vertical position;

an optical device for aligning a predetermined centerline of the ingot with a reference line; and two pairs of adjustable supports configured for supporting the ingot on at least four support points, each adjustable support of each pair of adjustable supports configured to engage a circumferential surface of the ingot and configured to move in a first direction generally parallel to a longitudinal axis of the ingot and in a second direction perpendicular to the first direction, wherein each adjustable support is configured to move independently of each of the other adjustable supports in at least the second direction to adjust the position of the ingot.

2. An alignment system as set forth in claim 1 wherein each adjustable support includes an inclined plane configured to support the ingot along the circumferential surface.

3. An alignment system as set forth in claim 2 wherein each inclined plane is disposed at an angle of about 45 degrees with respect to horizontal.

4. An alignment system as set forth in claim 1 wherein the optical device includes at least one laser.

5. An alignment system as set forth in claim 4 wherein the at least one laser includes two lasers disposed along a coincidental axis and wherein the two lasers face each other.

6. An alignment system as set forth in claim 5 wherein a center of the mounting block coincides with the axis along which the two lasers are disposed when the mounting block is positioned in the vertical position.

7. An alignment system as set forth in claim 1 further comprising a first pair of rails disposed on opposite sides of the longitudinal axis of the ingot and extending in a direction substantially parallel to the longitudinal axis of the ingot.

8. An alignment system as set forth in claim 7 wherein the adjustable supports are slidingly coupled to at least one of the rails of the first pair of rails.

9. An alignment system as set forth in claim 7 further comprising a second pair of rails disposed beneath the adjustable supports and above the first pair of rails and extending in a direction perpendicular to the first pair of rails wherein each rail of the second pair of rails is coupled to two adjustable supports disposed on opposite sides of the ingot.

10. An alignment system as set forth in claim 1 further comprising adjusters, wherein each adjustable support is coupled to one of the adjusters and wherein each adjuster is configured to move one of the adjustable supports laterally inward or outward with respect to the ingot.

11. An alignment system as set forth in claim 10 wherein each adjuster includes an adjustment screw.

12. An alignment system as set forth in claim 1 in combination with the ingot as mounted on the mounting block.

13. An alignment system for aligning an ingot of semiconductor or solar-grade material comprising:

a mounting block for attachment to the ingot;

at least one laser for aligning a predetermined centerline of the ingot with a reference line;

two pairs of adjustable supports configured for supporting the ingot on at least four support points, each adjustable support of each pair of adjustable supports configured to engage a circumferential surface of the ingot to adjust the position of the ingot; and a plurality of adjusters, wherein each adjustable support is coupled to one of the adjusters and wherein each adjuster is configured to move one of the adjustable supports independently of each of the other adjustable supports laterally inward or laterally outward with respect to the ingot.

14. An alignment system as set forth in claim 13 wherein the at least one laser includes two lasers disposed along a coincidental axis and wherein the two lasers face each other.

15. An alignment system as set forth in claim 14 wherein a center of the mounting block coincides with the axis along which the two lasers are disposed.

16. An alignment system as set forth in claim 13 further comprising a pair of rails disposed beneath the adjustable supports and extending in a direction substantially perpendicular to the longitudinal axis of the ingot wherein each rail of the pair of rails is coupled to two adjustable supports disposed on opposite sides of the ingot.

17. An alignment system as set forth in claim 13 wherein each adjustable support includes an inclined plane configured to support the ingot along the circumferential surface.

18. An alignment system as set forth in claim 17 wherein each inclined plane is disposed at an angle of about 45 degrees with respect to horizontal.

19. An alignment system as set forth in claim 13 wherein the mounting block is operatively connected to a pivot, the mounting block configured to rotate about the pivot between a horizontal position and a vertical position.

20. An alignment system as set forth in claim 1 further comprising a frame, wherein the mounting block is attached to the frame, wherein the optical device is attached to the frame and oriented to project a light beam along an axis that intersects a center of the mounting block when the mounting block is in the vertical position, and wherein the mounting block does not intersect the light beam axis when the mounting block is in the horizontal position.

* * * * *